Aug. 18, 1925. 1,549,992
L. KIRSCHBRAUN
APPARATUS FOR MAKING A FELTED FIBROUS WATERPROOF SHEET
Original Filed June 15, 1920 3 Sheets-Sheet 1
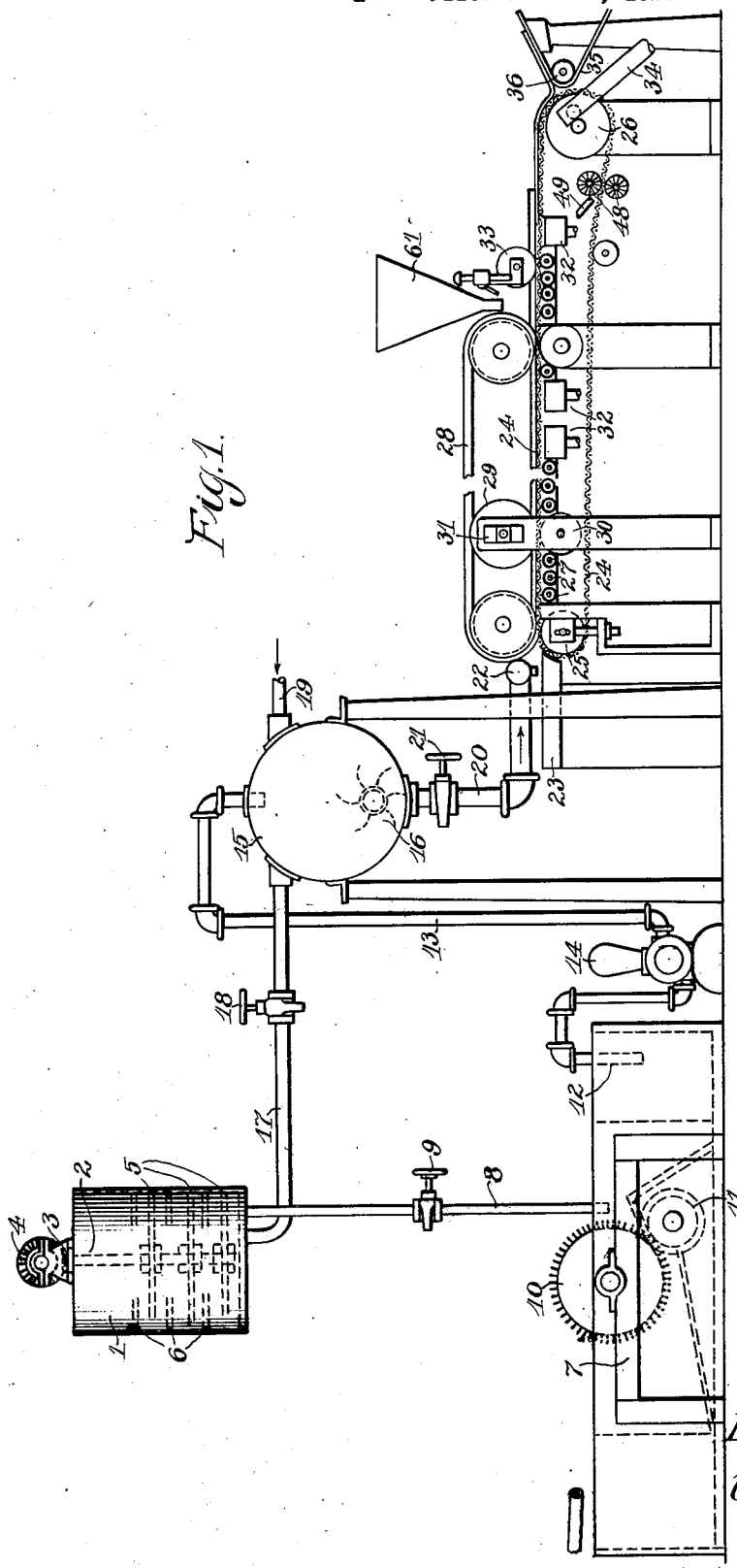

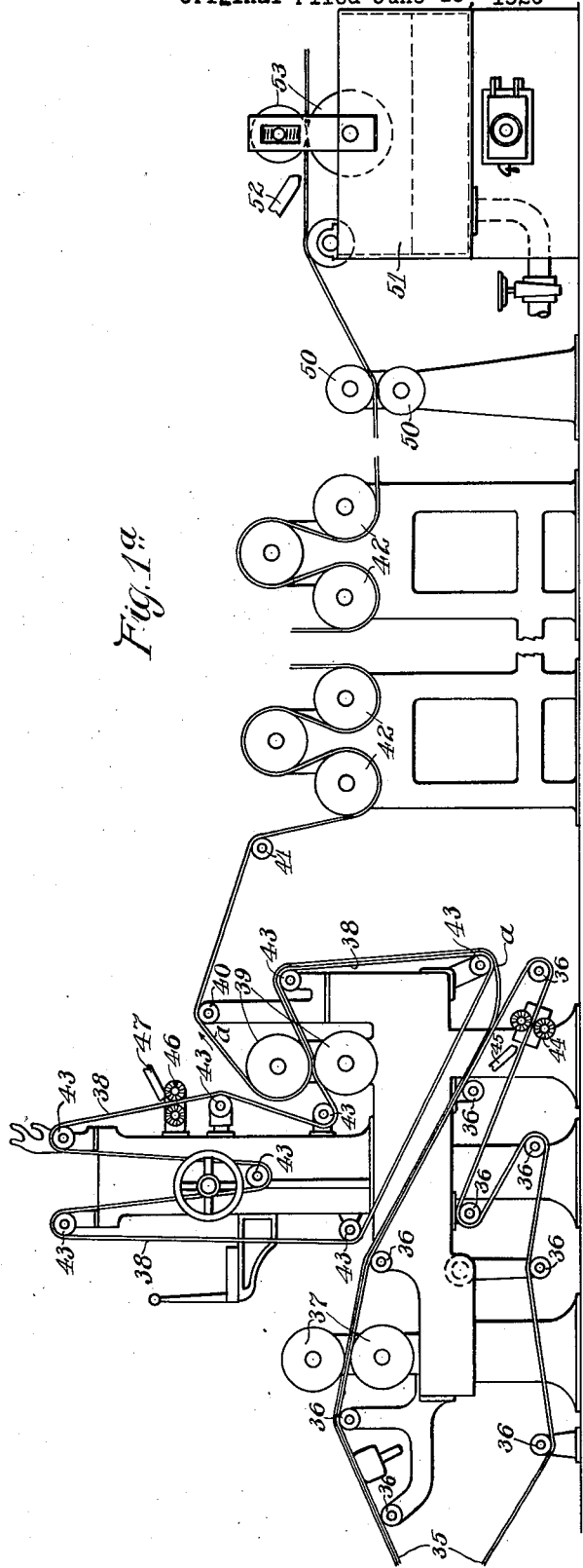

Aug. 18, 1925. 1,549,992
L. KIRSCHBRAUN
APPARATUS FOR MAKING A FELTED FIBROUS WATERPROOF SHEET
Original Filed June 15, 1920 3 Sheets-Sheet 3
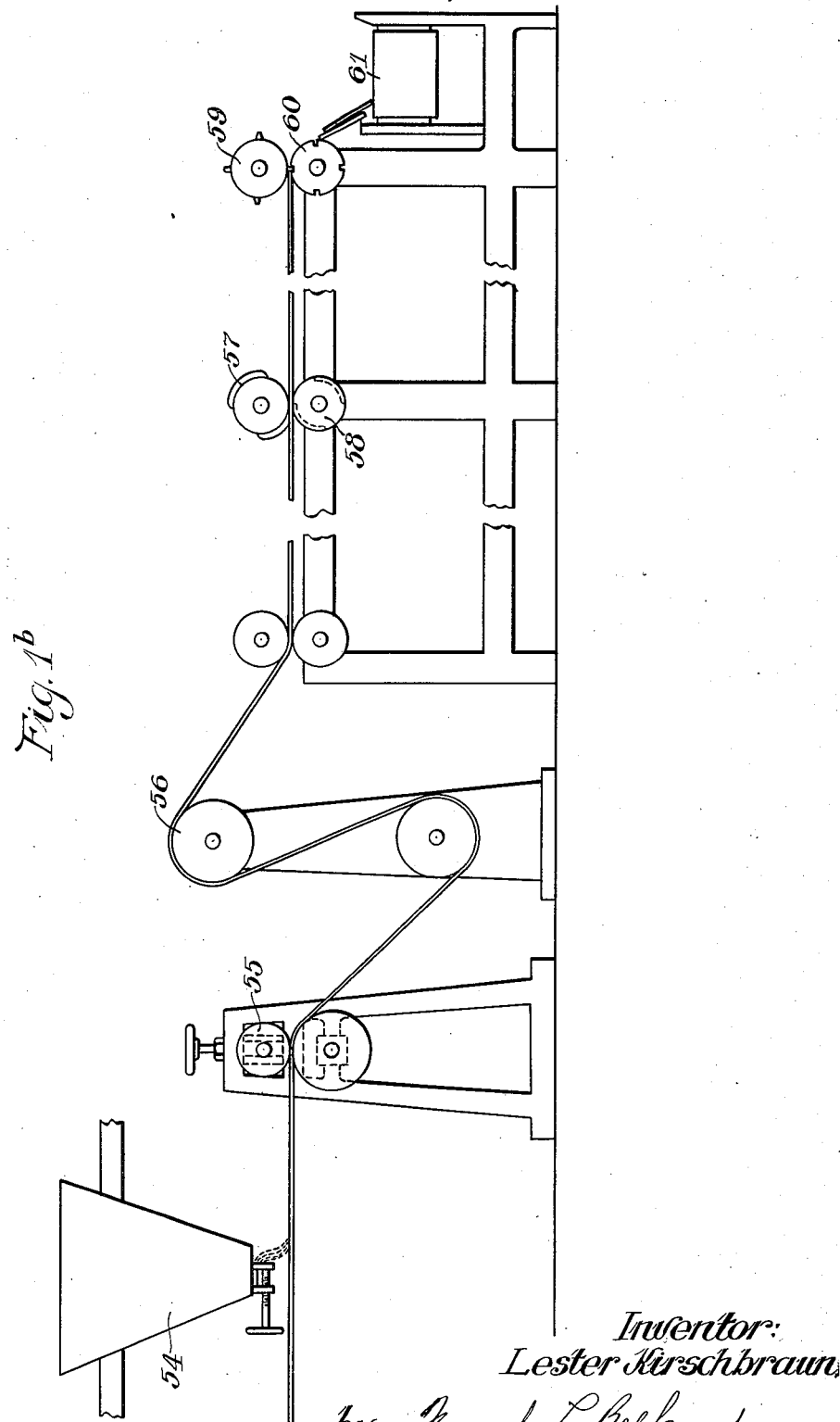
Inventor:
Lester Kirschbraun,
by Frank L Belknap
Atty.

Patented Aug. 18, 1925.

1,549,992

UNITED STATES PATENT OFFICE.

LESTER KIRSCHBRAUN, OF CHICAGO, ILLINOIS.

APPARATUS FOR MAKING A FELTED FIBROUS WATERPROOF SHEET.

Continuation of application Serial No. 389,219, filed June 15, 1920. This application filed September 17, 1924. Serial No. 738,279.

*To all whom it may concern:*

Be it known that I, LESTER KIRSCHBRAUN, a citizen of the United States, residing in the city of Chicago, county of Cook and State of Illinois, have invented certain new and useful Improvements in Apparatus for Making a Felted Fibrous Waterproof Sheet, of which the following is a specification.

This application is a continuation of application filed by me, Serial No. 389,219 on June 15th, 1920.

This invention relates to improvements in apparatus for making felted fibrous waterproof sheets, and has among its salient objects to provide a novel apparatus for making a felted or sheeted waterproof product used as roofing or covering of various kinds, and which consists essentially of a mixture of fibre, bitumen or like binder and an emulsifying agent formed into a tough, solid, dry body; to provide an apparatus for producing a product which obviates the necessity of using as a basis, prepared felt such as is used in asphalt shingles and similar elements; to provide apparatus for making a product which may have a wide range as to its flexibility, rigidity, weight and toughness, and in which a substantial body portion thereof can be made from relatively cheap or waste material; to provide an apparatus for making a product of the character referred to, in which a substantial portion of the materials thereof may be such waste products as sand, sawdust, clay and the like; to provide an apparatus for making a product of the character referred to in which the mixture is fed in an aqueous solution continuously to a felting or sheet forming apparatus and there formed into a sheet, and pressed, coated, dried and cut into any desired shape or size, all as a continuous operation; and in general to provide an improved invention of the character referred to.

In the drawings:

Figs. 1, 1$^A$ and 1$^B$ taken together indicate a more or less diagrammatic showing of my apparatus.

Referring to the drawings, 1 designates an emulsifying tank adapted to receive asphalt or other binder, and an emulsifying agent such as clay and water. This tank may be of any suitable construction and is provided with a rotating shaft 2 driven through gears 3 and 4, leading to any source of power. The shaft 2 carries a series of arms 5 cooperating with stationary arms 6 secured to the side of the emulsifier. The object of this emulsifier is to form an emulsification of the binder and emulsifying agent such as clay, etc. In making this emulsified composition, the clay is put into the emulsifier and water gradually added until a paste or doughy mixture is obtained. Asphalt or other pitchy waterproof binder while in a liquid condition is then slowly stirred into this paste and water is gradually added from time to time to obtain a working consistency. The water is preferably warm or hot. This mixture is thoroughly beaten up until the binder is uniformly dispersed through the emulsifying agent, the object being to reduce the binder to a very fine state of division and thoroughly amalgamate it with the clay. It is to be understood that other emulsifying agents than clay, may be used, and in certain cases other binder might be used, such as asphalt, coal tar, stearine, pitches or the like.

This mixture contained in the emulsifier can be delivered to a beater 7 through pipe 8 controlled by valve 9. The beater 7 is of a construction adapted for converting fibrous stock into pulp and is provided with a suitable beating roll or rolls 10 and 11. The pulp which I use may be made from any suitable fibrous material such as paper waste, sulphite, wood pulp, cotton waste, rags and hemp. After the fibre is beaten to a pulp, the pulp is delivered by means of pipes 12 and 13 and pump 14 to a mixing tank or stuff chest 15. This tank 15 is provided with a mechanical agitator 16 driven from any suitable source of power. The emulsified mixture heretofore referred to instead of being delivered to the beater 7 may be delivered direct to the mixing tank through pipe 17 controlled by valve 18. If the emulsified composition is delivered directly to the beater it is closely and thoroughly beaten into the pulp, and if it is delivered directly to the mixing tank or stuff chest, it is there mixed with the pulp in such a way as to produce a thoroughly uniform composition. It will be desirable in many cases to add a filler to the mixture which may be of such relatively cheap materials as sawdust, sand, ground cork or any suitable comminuted material. It may be desirable to add more clay to the mixing chest also.

The mixture in the tank 15 or stuff chest is thinned to the desired consistency by adding as much water as desired through the pipe 19. The consistency of the mixture in the stuffed chest will depend upon the character of the product to be formed and also upon the character of the materials contained therein.

In the formation of roofing compositions, the mixture I have found in certain cases, should be sufficiently dilute to permit the fibres to flow in the water so that they will have opportunities to interlock and interlace with each other when the water is separated out. It is also very important that the materials be sufficiently mixed to insure a thorough association of the fibre with the emulsified binder and with such filler, if a filler be used. The materials in question should be so mixed that when in an aqueous solution they will be free of any tendency to be sticky or adhere to the machine. It may be here noted that when the emulsified composition is formed, the particles of the binder should be so thoroughly and finely dispersed through the aqueous paste that the particles of the binder will tend to be thoroughly separated from each other and surrounded by the clay and water. The operator may ascertain that the emulsification has been sufficient by manual manipulation. If properly emulsified, it will have a smooth, soapy feeling and be free from any tendency to exhibit adhesiveness.

In the present invention the asphalt or analogous pitchy material, while in heated fluid or semi-liquid condition, is dispersed in very fine particles throughout the aqueous vehicle so that the minute particles of asphalt seem to be separated from each other and held out of contact with one another. As the expression has been used, the asphalt may be said to be in the internal phase and the vehicle in the external phase.

In any event, the mixture or matrix is non-adhesive and for example, can be readily washed off the hands or off machinery, with water. However, when the water is evaporated or removed, the particles of asphalt again become adhesive and sticky. While it is true that the asphalt or pitch used, may be solid or semi-solid, at atmospheric temperatures, it is in a heated, fluid or semi-liquid condition while being emulsified and resumes its normal semi-solid, or solid consistency when the matrix is cold without apparently altering the dispersion of the asphalt particles so long as contained in the aqueous vehicle. It is to be noted that this matrix is of such a character that when it is mixed with the fibre and formed into a sheet, the asphalt undergoes no change in character or constitution through the use of chemicals or other reagents.

After the material is thoroughly mixed, it is delivered to the sheet forming mechanism through pipe 20 controlled by valve 21. It may be advisable in some cases to have the mixture heated to facilitate evaporation or removal of the water. The delivery end of the pipe 20 is provided with nozzle 22 which is preferably the width of the sheet desired. The nozzle 22 delivers the mixture to a box 23 which overflows onto an endless travelling screen 24. This screen 24 which may be of a construction similar to those used in the paper making industry, may be a foraminated brass belt or wire, which is trained around rollers 25 and 26. Intermediate idler rollers may be provided as desired. The upper lap of the belt travels across rollers 27 forming in effect a table or support for the belt. At either side the screen is provided with confining belts or deckle straps 28; it being understood that these belts serve to prevent the material from flowing over the sides of the traveling screen.

Preferably spreader or distributing rolls 29 and 30 are provided and the frame spring gripped as shown at 31. As shown in Fig. 1, the apparatus is broken away to reduce the size of the drawings, the endless screen is of sufficient length to allow the desired amounts of water to drain through the screen. To facilitate the removal of the water from the sheet, I provide a plurality of suction boxes 32 and intermediate pressure rolls 33, a further suction pipe 34 may be provided to remove further water, if desired.

In forming the sheet passes over the foraminated belt or screen onto a canvas or other fabric belt 35, which is trained around a series of rolls 36 and driven from any suitable source of power. Pressure rolls 37 may also be provided. The now formed sheet "a" is threaded up over the belt 38 to feed rolls 39 and thence up over rolls 40 and 41 to a series of drying rolls 42. The belt 38 serves to take up any surplus moisture and it is thereafter dried by passing it around rolls 43.

The belt 35 may be cleaned by means of rotating brushes 44 and suitable water showers 45. The belt 38 can also be cleaned by brushes 46 and jet nozzle 47, and the screen by brushes 48 and jet nozzle 49. It will be understood, however, that one of the important features of the present invention is that the mixture which is to be sheeted is of such character that it can be readily washed off of the various belts and will not stick thereto.

After the now formed sheet leaves the rolls 42 it passes through rolls 50 to the coating mechanism 51, which is provided with delivery pipe 52 for the coating material, and presser rollers 53 which may be of any suitable construction. If granular faced roofing is being formed, the coated sheet can be fed beneath hopper 54 containing suitable granular material so as to cover the face of the roofing. The sheet then coated and covered with granular material is passed between presser rolls 55 and thence over cooling rolls 56 to slitting knives 57 carried by roll 58. The sheet which is now severed longitudinally may be cut transversely to form shingles or shingle strips by passing through transverse knives 59 carried by rollers 60. It is to be understood, of course, that these knives and rolls are so geared as to operate synchronously. The shingles or shingle strips are then carried away by travelling conveyor belt 61.

The apparatus here shown is adapted for making shingles or shingle strips of prepared roofing such as asphalt shingles and the like, but it is to be understood that the sheet after having been formed may be treated in any desired manner, such for example, as having a design printed thereon, etc.

In order to more readily practice the invention the following proportions of ingredients have been found satisfactory in the manufacture of fully saturated roofing felt. To 33 parts dry weight of fibrous stock is added an emulsion composed of 55 parts by weight of asphalt emulsified with 12 parts by weight of colloidal clay contained in an aqueous vehicle. It will be understood that these proportions will vary depending upon the nature of the stock and the degree of saturation with asphalt desired in the finished sheet. Of course, during the sheet forming operation, the particles of binder will be distributed among the fibres in the sheet during the felting of the same.

I claim as my invention:

1. In an apparatus for forming a waterproof felted sheet, the combination with means for emulsifying argilliferous emulsifying substance and water with a normally adhesive bitumen to form a non-adhesive substance, of a beater for forming a fibrous pulp, a mixer communicating separately with the beater and emulsifying means for combining the emulsion with the fibrous pulp from the beater, means for felting the fibrous material and uniting the emulsified bitumen therewith.

2. In an apparatus for forming a waterproof sheet, the combination with an emulsifier for producing a non-adhesive emulsion of an adhesive binder substance, of a beater for forming a fibrous pulp stock, mixing means connected with the emulsifier and beater whereby a regulated mixture of the separate ingredients is produced, a paper forming mechanism whereby the combined emulsion and paper pulp are formed into a continuous sheet.

3. In an apparatus for forming a waterproof sheet, the combination with an emulsifier for producing a non-adhesive emulsion of an adhesive binder substance, of a beater for forming a fibrous pulp stock, mixing means connected with the emulsifier and beater whereby a regulated mixture of the separate ingredients is produced, a paper forming mechanism whereby the combined emulsion and paper pulp are formed into a continuous single ply sheet and suction means for withdrawing the moisture therefrom.

4. In an apparatus for forming a waterproof sheet, the combination with an emulsifier for producing a non-adhesive emulsion of a relatively solid adhesive bituminous binder, of a beater for forming a fibrous pulp stock, a mixing means connected with the emulsifier and beater, means connecting said elements for introducing regulated quantities of pulp stock and emulsion to the mixing means, a paper forming mechanism connected to the mixing means whereby the combined emulsion and paper stock are formed into a continuous ply, and a suction means for withdrawing the moisture therefrom.

5. In an apparatus for forming a waterproof sheet, the combination with an emulsifier for producing a non-adhesive emulsion of an adhesive binder substance, of a beater for forming a fibrous pulp stock, separate mixing means communicating with the emulsifier and beater whereby a regulated mixture of the separate ingredients is produced, a paper forming mechanism whereby the combined emulsion and paper pulp are formed into a continuous sheet.

6. In an apparatus for forming a waterproof felted sheet, the combination with means for emulsifying argilliferous emulsifying substance and water with a normally adhesive bitumen to form a non-adhesive substance, of a beater for forming a fibrous pulp, means for combining the emulsion with the fibrous pulp, means for felting the fibrous material and uniting the emulsified bitumen therewith.

LESTER KIRSCHBRAUN.